US008262104B2

(12) United States Patent
Kallevig et al.

(10) Patent No.: US 8,262,104 B2
(45) Date of Patent: Sep. 11, 2012

(54) STAND ON RIDER WITH THIGH PAD PIVOTALLY LINKED TO FOLDABLE FOOT PLATFORM

(75) Inventors: Jeffrey B. Kallevig, Eden Prairie, MN (US); Thomas K. Bricko, Lakeville, MN (US)

(73) Assignee: The Toro Company, Bloomington, MN (US)

( * ) Notice: Subject to any disclaimer, the term of this patent is extended or adjusted under 35 U.S.C. 154(b) by 475 days.

(21) Appl. No.: 12/466,109

(22) Filed: May 14, 2009

(65) Prior Publication Data

US 2010/0289233 A1 Nov. 18, 2010

(51) Int. Cl.
*B62D 63/00* (2006.01)
(52) U.S. Cl. .................. 280/32.7; 172/433; 172/434
(58) Field of Classification Search ............ 280/32.7; 172/433, 434
See application file for complete search history.

(56) References Cited

U.S. PATENT DOCUMENTS

| | | | | |
|---|---|---|---|---|
| 5,809,755 A * | 9/1998 | Velke et al. | | 56/10.8 |
| 5,810,371 A * | 9/1998 | Velke | | 280/32.7 |
| 6,094,897 A * | 8/2000 | Velke et al. | | 56/14.7 |
| 6,560,952 B2 * | 5/2003 | Velke et al. | | 56/14.7 |
| 6,595,306 B2 * | 7/2003 | Trego et al. | | 180/19.2 |
| 6,935,092 B2 * | 8/2005 | Velke et al. | | 56/14.7 |
| 6,948,739 B2 * | 9/2005 | Gallagher et al. | | 280/770 |
| 7,267,369 B2 * | 9/2007 | Gallagher et al. | | 280/770 |
| 7,458,588 B2 * | 12/2008 | Kallevig | | 280/32.7 |
| 7,740,259 B2 * | 6/2010 | Kraimer et al. | | 280/166 |
| 7,793,979 B2 * | 9/2010 | Kraimer et al. | | 280/770 |
| 2005/0016782 A1 * | 1/2005 | Gallagher et al. | | 180/89.12 |
| 2005/0236197 A1 * | 10/2005 | Gallagher et al. | | 180/65.1 |
| 2007/0207024 A1 * | 9/2007 | Kraimer et al. | | 414/685 |
| 2008/0196374 A1 * | 8/2008 | Gamble et al. | | 56/14.7 |
| 2009/0302562 A1 * | 12/2009 | Kallevig et al. | | 280/32.5 |
| 2010/0289233 A1 * | 11/2010 | Kallevig et al. | | 280/32.5 |

OTHER PUBLICATIONS

Wright Manufacturing, Inc., Wright Stander Parts List for 36" & 42" Machines, 1998-2001.
Auburn Consolidated Industries, Inc., Great Dane Surfer Operator's Manual, 2006.

* cited by examiner

*Primary Examiner* — Jeffrey J Restifo
(74) *Attorney, Agent, or Firm* — James W. Miller

(57) ABSTRACT

An outdoor power equipment unit, such as a mower, includes a foot platform for supporting a standing operator who operates the unit while standing atop the foot platform. The foot platform can be pivoted upwardly from a substantially horizontal orientation into a substantially vertical, folded up orientation against the rear of the traction vehicle. A thigh pad engages against the thighs of the operator and is pivotally linked to the foot platform to pivot on the traction vehicle with the pivotal motion of the foot platform. When the foot platform is horizontal, the thigh pad is pivoted to be angled downwardly and rearwardly relative to the rear of the traction vehicle. When the foot platform is folded up, the thigh pad is pivoted inwardly relative to the rear of the traction vehicle to be sandwiched between the rear of the traction vehicle and the folded up foot platform.

16 Claims, 7 Drawing Sheets

STAND ON RIDER WITH THIGH PAD PIVOTALLY LINKED TO FOLDABLE FOOT PLATFORM

TECHNICAL FIELD

This invention relates to an outdoor power equipment unit, such as a mower, that is operated in a stand on mode by an operator who stands atop a foot platform on the unit.

BACKGROUND OF THE INVENTION

Various types of outdoor power equipment units are known, including mowers and compact utility loaders, which are operated by an operator who stands on the traction vehicle of the unit during operation. A foot platform is provided for supporting the operator in the stand on mode. Typically, the foot platform is located at the rear of the traction vehicle. In some cases, the foot platform is pivotal between a substantially horizontal, deployed position in the stand on mode and a substantially vertical, storage position in a storage mode or a walk-behind mode.

Some products of this type have a cushioned thigh pad mounted on the rear of the traction vehicle immediately ahead of the foot platform. When the operator is operating the traction vehicle, he or she can rest or lean against the thigh pad with the front of the operator's thighs engaging the thigh pad. This increases the comfort of the operator. However, the Applicants have discovered that conventional thigh pads in prior art devices of this type are not positioned in the most effective way for operator comfort when the unit is being operated in the stand-on mode.

Moreover, if the foot platform is pivotal into a substantially vertical, storage position, the thigh pad mounted on the rear of the traction vehicle can form an obstruction to how tightly or closely the foot platform can be positioned relative to the rear of the traction vehicle. It is desirable that the foot platform when raised into its storage position be as tight or as close as possible to the rear of the traction vehicle. This desirably decreases the length of the unit as much as possible to enhance carrying the unit on a trailer in the storage mode or permits the operator to walk behind the unit as closely as possible in the walk behind mode. The Applicants have discovered that satisfying this latter desire conflicts with the use of a thigh pad on the rear of the unit. It would be an advance in the art to find a way to resolve this conflict. This invention represents such an advance.

SUMMARY OF THE INVENTION

One aspect of this invention relates to an outdoor power equipment unit which comprises a self propelled traction vehicle. An implement is carried on the traction vehicle for performing a ground grooming. A foot platform is carried on a rear of the traction vehicle. The foot platform is configured for supporting a standing operator in a stand on mode of operation of the traction vehicle. A pad is carried on the rear of the traction vehicle in a first orientation having a downward and rearward angle of inclination relative to the traction vehicle to allow the standing operator's thighs to more comfortably engage the pad when the operator is standing atop the foot platform and is leaning or tilting forwardly Another aspect of this invention relates to an outdoor power equipment unit which comprises a self propelled traction vehicle. An implement is carried on the traction vehicle for performing a ground grooming or working operation. A foot platform is carried on a rear of the traction vehicle. The foot platform is pivotally mounted on the traction vehicle to permit the foot platform to be located in a substantially horizontal, deployed position for supporting a standing operator or to be pivoted upwardly relative to the traction vehicle from the deployed position to be placed into in a substantially vertical, storage position on the traction vehicle. A pad is carried at a height on the rear of the traction vehicle to engage against the thighs of the standing operator when the foot platform is in the deployed position thereof and the operator is standing atop the foot platform. The pad is movable on the traction vehicle with the pad having a first position that is pulled away from the rear of the traction vehicle when the foot platform is in the deployed position thereof and with the pad having a second position that is pushed inwardly closer to the rear of the traction vehicle when the foot platform is in the storage position thereof.

Yet another aspect of this invention relates to an outdoor power equipment unit which comprises a self propelled traction vehicle. An implement is carried on the traction vehicle for performing a ground grooming or working operation. A pivotal foot platform is provided for supporting a standing operator who operates the unit while standing atop the foot platform. The foot platform can be pivoted upwardly from a substantially horizontal orientation into a substantially vertical, folded up orientation against the rear of the traction vehicle. A thigh pad engages against the thighs of the operator and is pivotally linked to the foot platform to pivot on the traction vehicle with the pivotal motion of the foot platform. The thigh pad is pivoted to be angled downwardly and rearwardly relative to the rear of the traction vehicle when the foot platform is in the substantially horizontal orientation. The thigh pad is pivoted inwardly relative to the rear of the traction vehicle to be sandwiched between the rear of the traction vehicle and the folded up foot platform when the foot platform is in the folded up orientation thereof.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
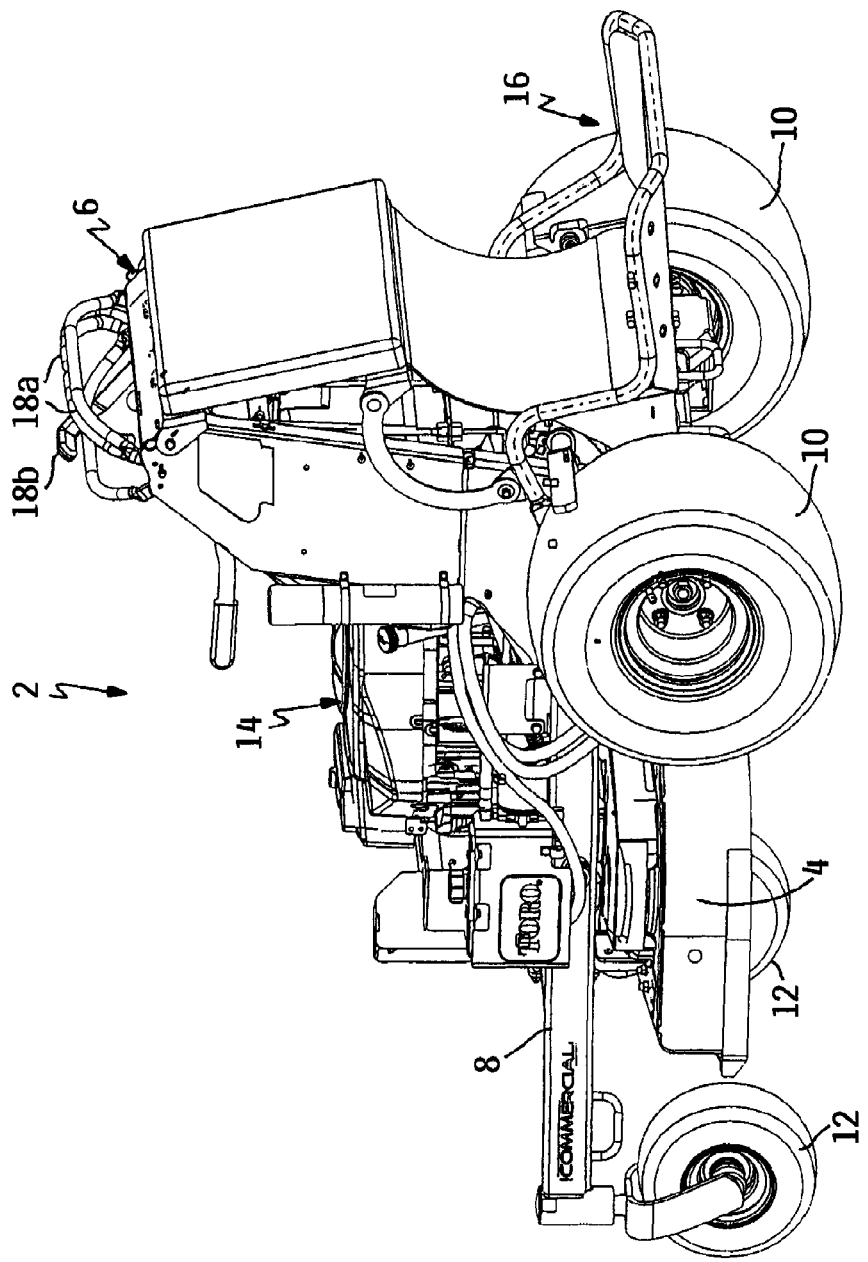
FIG. 1 is a perspective view of one embodiment of an outdoor power equipment unit according to this invention.

An outdoor power equipment unit according to this invention is illustrated generally as 2 in FIG. 1. Unit 2 comprises a mower having a rotary cutting deck 4 that houses one or more cutting blades that rotate about vertical axes in substantially horizontal cutting planes. However, this invention is not limited to mowers having rotary cutting decks 4 or even to mowers, but may be used on other outdoor power equipment units. For example, unit 2 can also comprise a compact utility loader of the types manufactured and sold by The Toro Company, the assignee of this invention, under the Dingo® brand name.

Briefly, unit 2 comprises a traction vehicle 6 that has a fore and aft extending frame 8 that carries a pair rear drive wheels 10 and a pair of unpowered front caster wheels 12. Drive wheels 10 are separately powered by independent motors such that drive wheels 10 can be driven independently of one another. This permits spin or skid type turning in a zero radius turn manner by rotating one drive wheel 12 in a forward direction while simultaneously rotating the other drive wheel 12 in a reverse direction. Such zero radius turn drive systems are well known in the art and need not be further described herein.

Cutting deck 4 is suspended beneath vehicle frame 8 in any suitable manner. A power source or prime mover, such as an internal combustion engine 14, is carried on vehicle frame 8 or is alternatively carried directly atop cutting deck 4. An operator's station is provided at or closely adjacent the rear of traction vehicle 6. The operator's station includes a foot platform 16 that will be described in more detail hereafter. The operator's station also carries various hand controls 18a, 18b for use by the operator in operating unit 2. Hand controls 18a operate drive wheels 10 while other hand controls 18b operate cutting deck 4.

Figure 2:
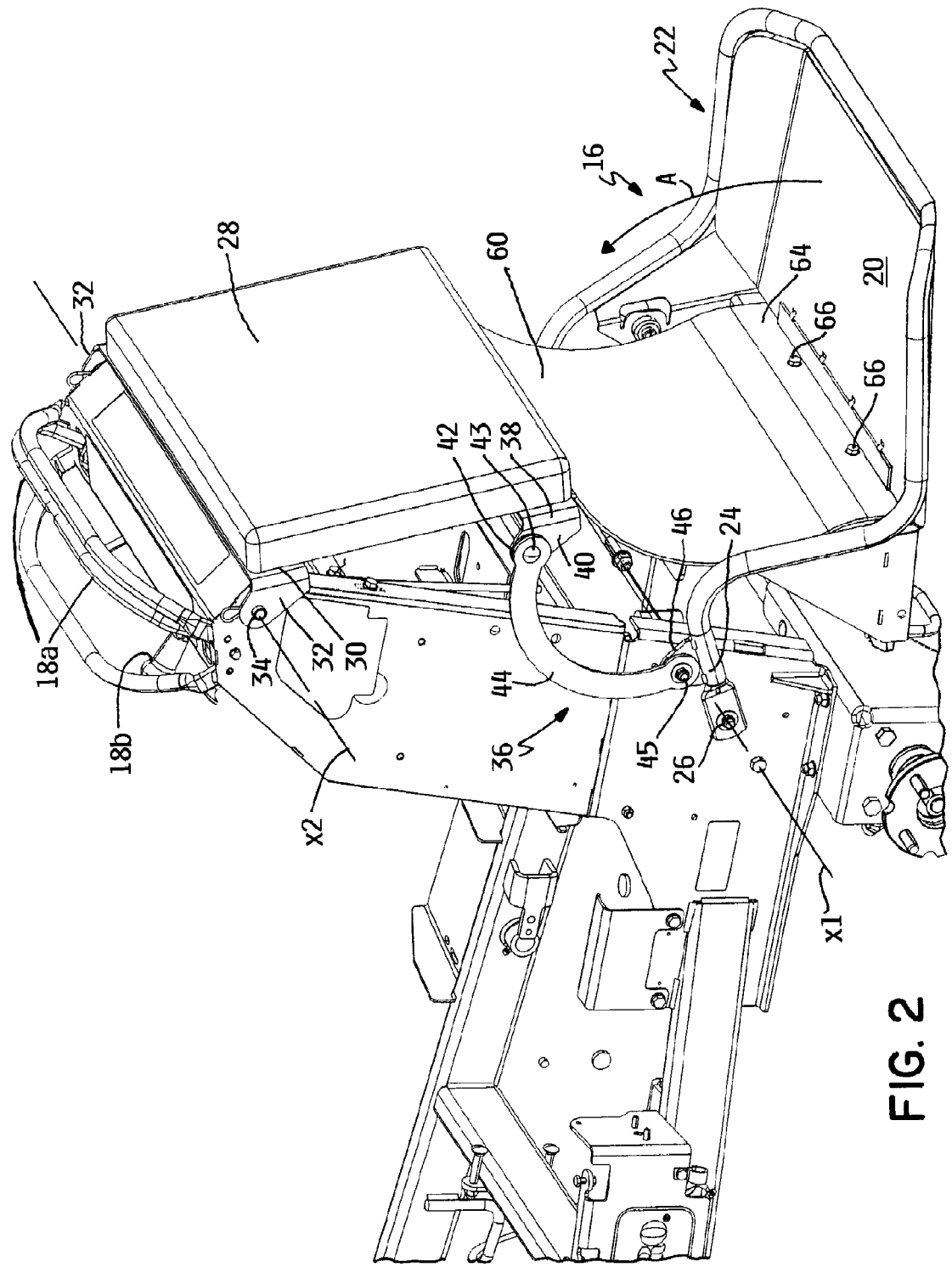
FIG. 2 is a perspective view of a portion of the rear of the traction vehicle of the outdoor power equipment unit of FIG. 1, particularly illustrating a foot platform in a substantially horizontal, deployed position of the foot platform in a stand on mode of operation.
Figure 3:
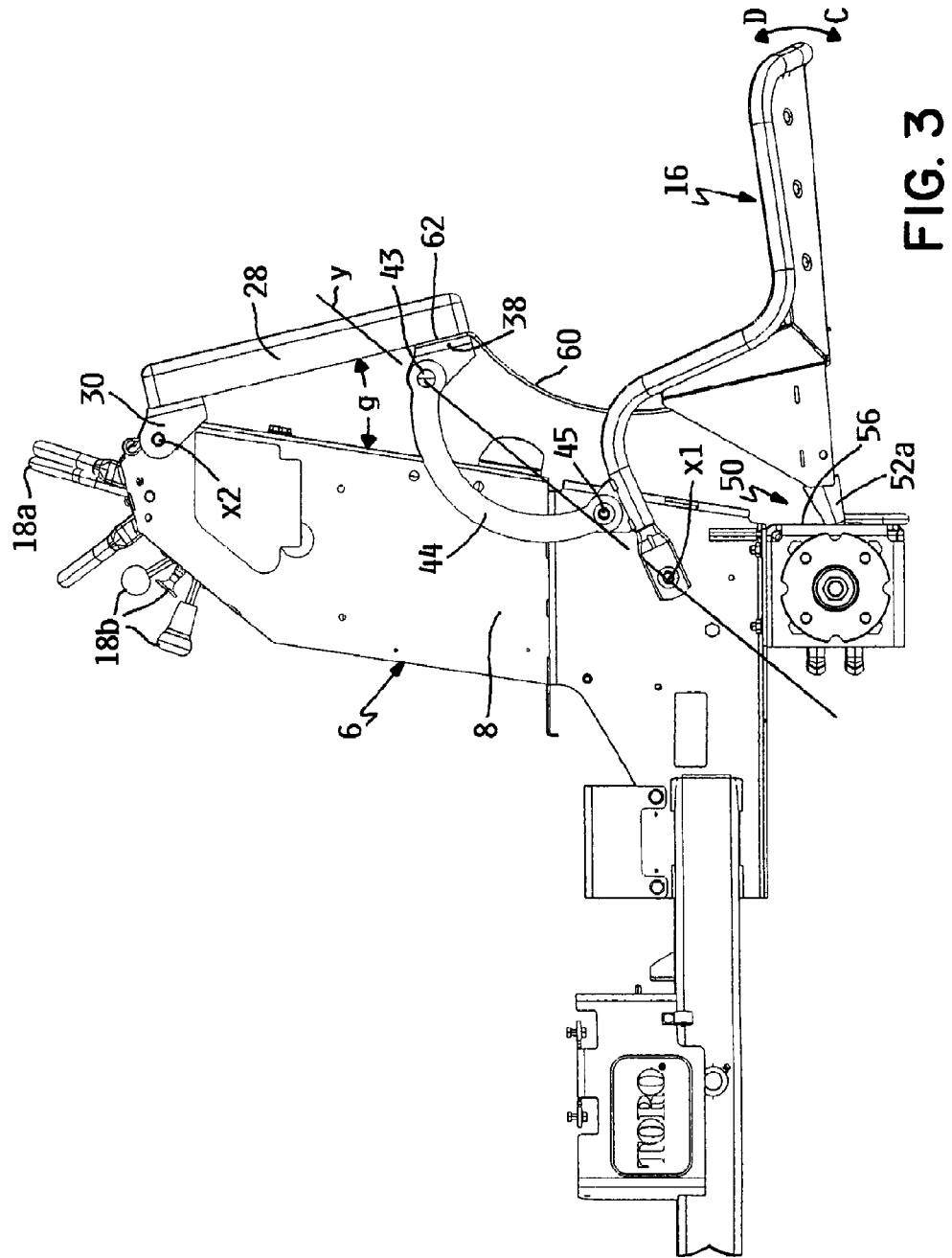
FIG. 3 is a side elevational view corresponding to the perspective view of FIG. 2.
Figure 4:
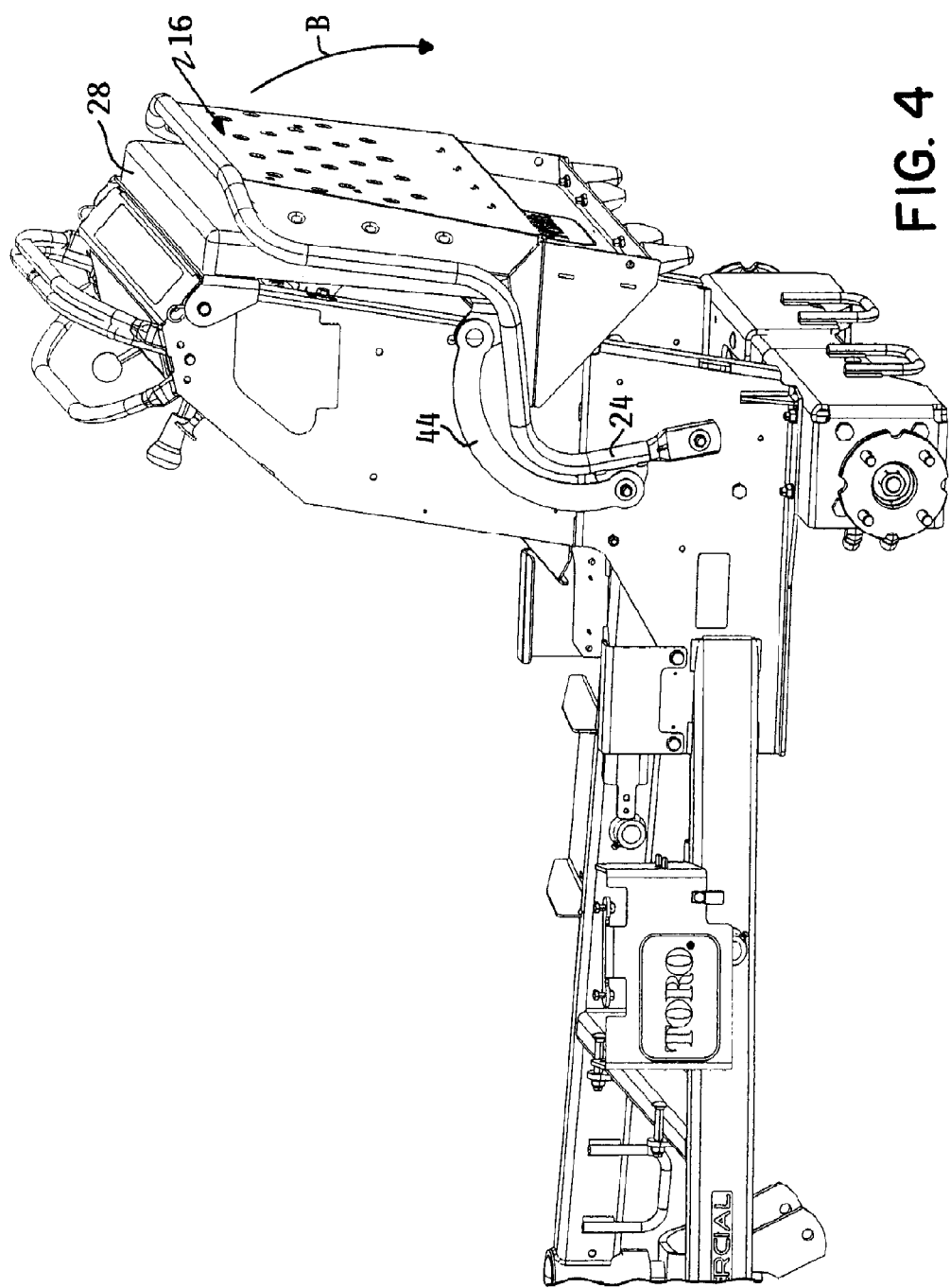
FIG. 4 is a perspective view of a portion of the rear of the traction vehicle of the outdoor power equipment unit of FIG. 1, particularly illustrating the foot platform in a substantially vertical, storage position of the foot platform in a walk behind mode of operation or in a storage mode.

Referring now to FIGS. 2 and 3, foot platform 16 comprises a floor 20 that is fixed to and is located within a U-shaped platform frame 22 having a pair of forwardly extending pivot arms 24. Pivot arms 24 of platform frame 22 are pivotally attached to the rear of vehicle frame 8 by pivots 26, one of which is shown in FIG. 2. Thus, foot platform 16 is pivotal relative to vehicle frame 8 about a substantially horizontal, platform pivot axis shown as x1 in FIG. 2. This permits foot platform 16 to be selectively placed into either a lowered, substantially horizontal, deployed position as shown in FIG. 2 or a raised, substantially vertical, storage position as shown in FIG. 4.

A substantially rectangular, cushioned pad 28 is also pivotally attached to the top rear of vehicle frame 8. The front side of the top end of pad 28 is fixed to a first U-shaped support bracket 30 having a pair of forwardly extending ears 32. Each ear 32 is pivotally journalled by a pivot 34 to one side of the top rear of vehicle frame 8 at a location substantially immediately behind and below hand controls 18a, 18b. Thus, pad 28 is free to also pivot about a substantially horizontal, pad pivot axis shown as x2 in FIG. 2. Pad pivot axis x2 is substantially higher than platform pivot axis x1 and somewhat behind or rearward of platform pivot axis x1. At the location of pad 28 as shown in FIGS. 2 and 3, pad 28 is positioned to engage against the operator's thighs as the operator stands atop floor 20 of foot platform 16 and operates unit 2 by gripping and manipulating hand controls 18a, 18b. Pad 28 preferably has a weatherproof outer covering and an interior filling of a relatively soft and compressible material, e.g. foam or the like, to allow pad 28 to compress to soften the engagement between the operator and pad 28.

Pad 28 is pivotally linked on each side thereof to a corresponding side of foot platform 16 by a pivotal linkage denoted generally as 36. Only the pivotal linkage 36 on the left side of pad 28 and foot platform 16 can be seen in the figures. An identical linkage 36 is present on the right side of pad 28 and foot platform 16 but is hidden in the figures. Thus, a description of the left side pivotal linkage 36 will also serve to describe the right side pivotal linkage.

Pivotal linkage 36 includes a second U-shaped support bracket 38 much like first bracket 30 used to pivotally connect the top end of pad 28 to vehicle frame 8. Second bracket 38 is fixed to the bottom end of pad 28. Each end of second bracket 38 also has a forwardly extending ear 40. However, instead of being pivotally connected to vehicle frame 8 as in the case of first bracket 30, each ear 40 on each end of second bracket 38 is pivotally connected by a pivot 43 to a top end 42 of a pivotal, curved connecting link 44 that is also part of linkage 36. The bottom end of pivotal connecting link 44 is pivotally connected by a pivot 45 to an ear 46 on one of the pivot arms 24 of platform frame 22.

Figure 5:
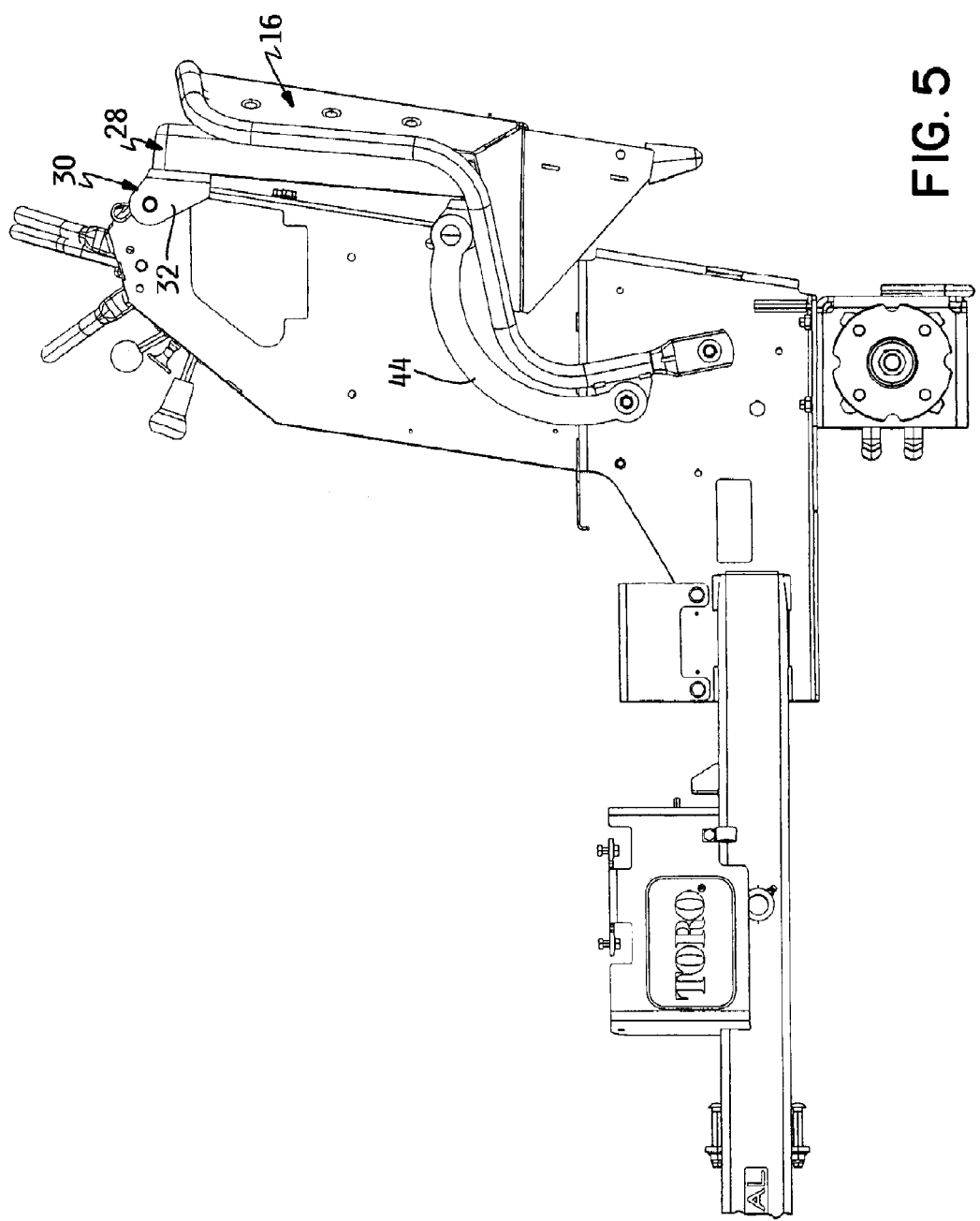
FIG. 5 is a side elevational view corresponding to the perspective view of FIG. 4.

The operator is able to selectively and manually pivot foot platform 16 between the lowered, substantially horizontal, deployed position, as shown in FIGS. 2 and 3, and the raised, substantially vertical, storage position, as shown in FIGS. 4 and 5. This is done simply by lifting upwardly on the rear of foot platform 16 to pivot foot platform 16 upwardly in the direction of the arrow A in FIG. 2 until foot platform 16 reaches the storage position shown in FIG. 4. In the storage position of foot platform 16, a spring biased latch pin (not shown) will automatically snap into place in a locking hole (not shown) in vehicle frame 8 to thereafter hold foot platform 16 in the storage position. To lower foot platform 16 back down to its deployed position, the operator need only pull outwardly on a knob 48 (shown in FIG. 7) that is operatively connected to the latch pin to retract the latch pin against the spring bias to clear the latch pin from the locking hole. The operator will then keep his or her hand underneath foot platform 16 to help support the weight of foot platform 16 as gravity causes foot platform 16 to rotate downwardly as shown by the arrow B in FIG. 4.

The purpose of pivotally interconnecting foot platform 16 and pad 28 is to use the movement of foot platform 16 to automatically adjust the inclination of pad 28 in both the deployed and storage positions of foot platform 16. As best shown in FIG. 3, when foot platform 16 has been lowered into its substantially horizontal, deployed position, pad 28 has also been simultaneously angled or inclined to the rear as it extends downwardly from its pivot connection to vehicle frame 8. This is best indicated in FIG. 3 by the angle g between pad 28 and the rear of vehicle frame 8. The Applicants have found that this downward and rearward angle of inclination relative to vehicle frame 8, and relative to an operator who is standing on foot platform 16, is most comfortable to the operator since most operators tend to tilt or lean forwardly somewhat when standing on foot platform 16. Pad 28 is now tilted or angled in a manner that better approximates the forward tilt or angle of the front of an operator's thighs so that pad 28 is more parallel to the front of the operator's thighs to provide a more comfortable support surface therefor.

However, when the operator manually pivots foot platform 16 up into the storage position thereof as shown in FIGS. 4 and 5, the pivotal connecting link 44 between foot platform 16 and pad 28 automatically pivots the bottom end of pad 28 forwardly towards the rear of vehicle frame 8. In effect, this folds up pad 28 against the rear of vehicle frame 8 so that pad 28 is now closely adjacent and substantially parallel to the rear of vehicle frame 8. Foot platform 16 is then able to nest up against pad 28 and to be closely adjacent thereto in the storage position of foot platform 16. Thus, in the storage position of foot platform 16, foot platform 16 and pad 28 have both been folded in tightly and closely against the rear of vehicle frame 8 even though in the deployed position of foot platform 16 both foot platform 16 and pad 28 are extended away from the rear of vehicle frame 8.

The tight folding of foot platform 16 and pad 28 against the rear of vehicle frame 8 is an advantage when unit 2 is being transported on a trailer or stored in a garage during a storage mode since the front to back length of unit 2 is minimized to decrease the overall length of unit 2 to a minimum. It is also an advantage when unit 2 is used in a walk behind mode with foot platform 16 having been folded up and with the operator walking on the ground behind unit 2 during operation of unit 2. It permits the operator to be closely adjacent the rear of vehicle frame 8 for ease in reaching hand controls 18a, 18b and in seeing to the front of unit 2. Nonetheless, when foot platform 16 is deployed as shown in FIG. 2 for use in the stand on mode of operation, pad 28 pivots or inclines rearwardly as it extends downwardly to better and more comfortably engage against the thighs of the operator.

Figure 6:
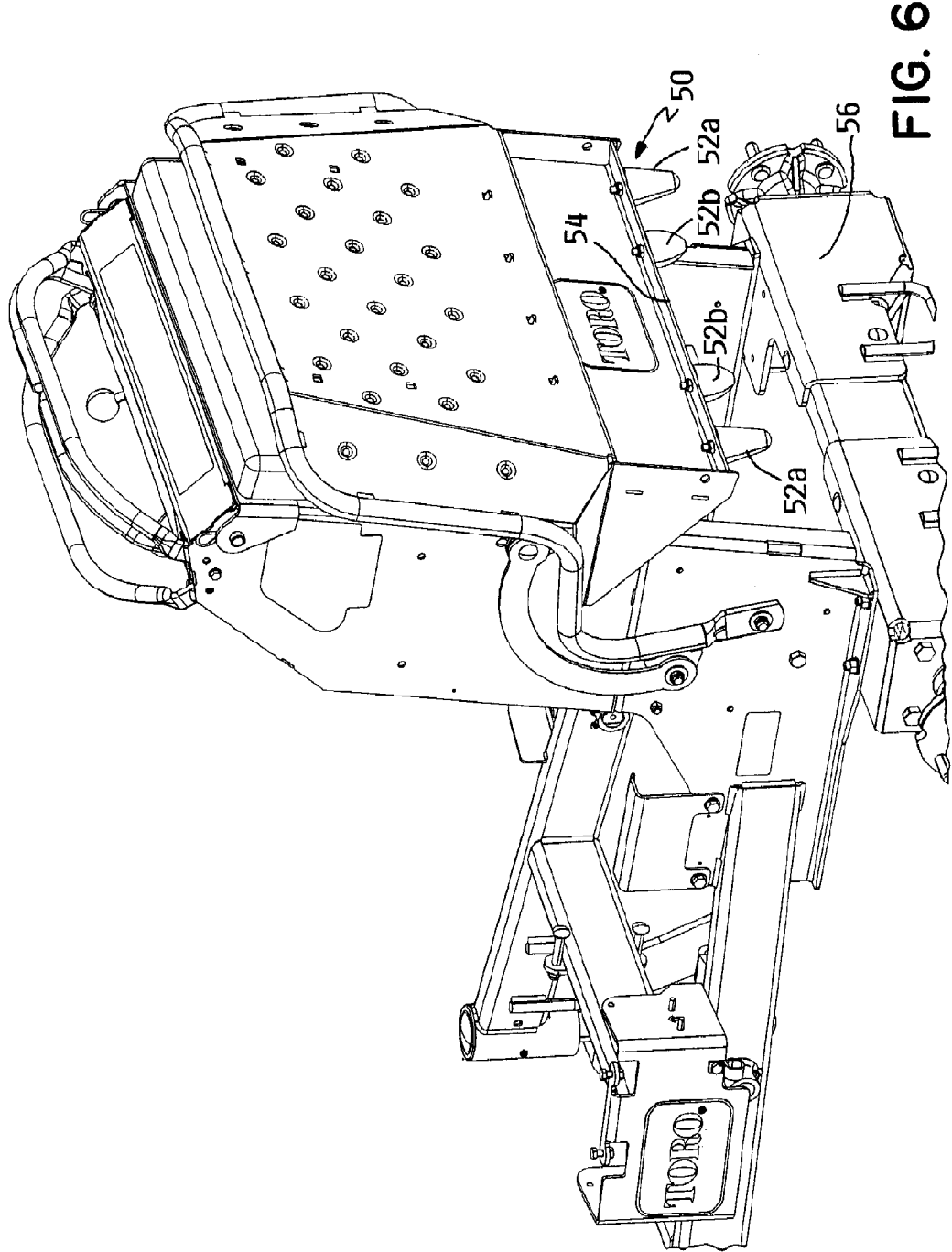
FIG. 6 is a perspective view similar to FIG. 4, particularly illustrating a plurality of elastomeric cushioning members on a forwardly facing edge of the foot platform that form part of a ride cushioning system for the foot platform.
Figure 7:
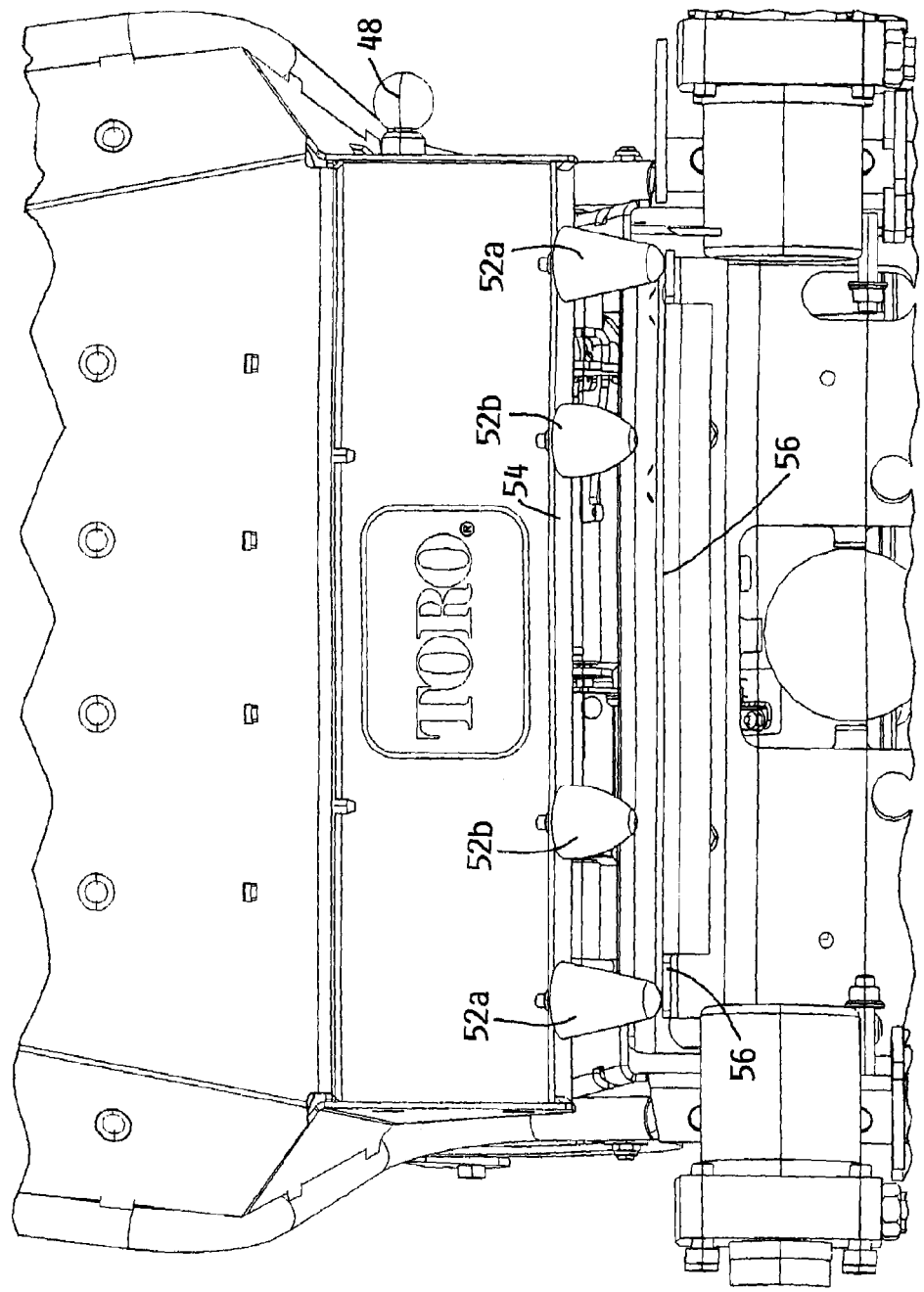
FIG. 7 is a bottom plan view of a portion of the foot platform of the outdoor power equipment unit of FIG. 1, particularly showing the foot platform in the substantially horizontal, deployed position thereof with a first pair of the elastomeric cushioning members on the foot platform in engagement with a rearwardly facing portion of the frame of the traction vehicle of the outdoor power equipment unit.

As shown most clearly in FIGS. 6 and 7, a ride cushioning system 50 is also used between foot platform 16 and the rear of vehicle frame 8 to resiliently support foot platform 16 for up and down motion over a relatively small range as indicated by the reciprocal arrows C and D in FIG. 3. This ride cushioning system 50 comprises a pair of elastomeric cushioning members 52a, 52b, i.e. rubber bumpers, located on each side of a forwardly facing edge 54 of foot platform 16. Thus, there are a total of four such cushioning members 52. A first cushioning member 52a and an adjacent second cushioning member 52b are located in a first pair on the left side of foot platform 16. Identical first and second cushioning members 52a and 52b are located in a second pair on the right side of foot platform 16.

First cushioning member 52a in each pair has a conical shape with a rounded tip or nose. Second cushioning member 52b in each pair has a similar generally conical shape but has a more rounded exterior surface than that of first cushioning member 52a. The most significant difference between the first and second cushioning members is the length thereof, with first cushioning member 52a being approximately 20% to 40% longer than second cushioning member 52b. When foot platform 16 is in the substantially horizontal, deployed position thereof, the longer first cushioning members 52a will each engage or abut against a rearwardly facing surface of portion 56 of vehicle frame 8. When no operator is standing on foot platform 16, the engagement of first cushioning members 52a with vehicle frame 8 tends to give foot platform 16 a slight upward bias as best shown in FIG. 3.

When an operator steps onto foot platform 16, the weight of the operator will tend to pivot foot platform 16 downwardly about the platform pivot axis x1, thus compressing first cushioning members 52a against vehicle frame 8. If the operator weighs less than a predetermined amount, e.g. 80 to 120 lbs. or so, only first cushioning members 52a will come into play and be compressed with the shorter set of second cushioning members 52b providing overload support on bumps. However, for heavier operators, namely those operators weighing more than 80 to 120 lbs. or so, first cushioning members 52a will be compressed to the point where the noses or tips of second cushioning members 52b engage against the rearwardly facing portion 56 of vehicle frame 8. Thereafter, both the first and second cushioning members 52a and 52b are compressed together. A heavier operator in the 160-250 pound range will significantly compress all four rubber members 52a and 52b. In either case, i.e. whether only first cushioning member 52a is being compressed or both the first and second cushioning members 52a and 52b are being compressed together, the compression continues until the weight of the operator on foot platform 16 is counterbalanced by the rearward biasing force provided by the collective compression of cushioning members 52.

In this counterbalanced, cushioned configuration of foot platform 16, the operator is protected from impact shocks and the like that might be encountered by vehicle frame 8, i.e. such as when one or more of the wheels of the frame hit an obstruction or temporarily drop into a hole or depression in the ground. The resilient support provided by cushioning members 52 permits foot platform 16 to bob up and down slightly during such an impact shock and attenuates the force of the impact shock lessening how much of the impact shock is transmitted through to foot platform 16. In addition, ride cushioning system 50 formed by cushioning members 52 attenuates the transmission of vibration from other components, such as prime mover 14 or the rotation of the blades in cutting deck 4, to foot platform 16. Thus, the ride of the operator on foot platform 16 is smoother and considerably more comfortable than if ride cushioning system 50 were absent.

The use of two differently sized, elastomeric cushioning members 52a and 52b in each pair is desirable since it allows a ride that is more comfortable to both lighter and heavier operators than if a single cushioning member 52 were used. With a single cushioning member, such a cushioning member would have to be relatively stiff in order to have enough compression to absorb and counterbalance the weight of very heavy operators, e.g. more than 225 lbs. or so. Such a stiff cushioning member would not compress much at all if a light operator were to step onto foot platform 16. This means that most light operators would still experience a relatively stiff ride.

However, with the two cushioning members disclosed 52a and 52b, first cushioning member 52a is preferably soft enough to compress readily under the weight of a light operator giving a light operator a soft and comfortable ride. But, when a heavier operator steps onto foot platform 16, second cushioning member 52b also becomes effective such that both cushioning members have to thereafter be compressed. The relative hardness and softness of the two cushioning members can be adjusted to provide even heavy operators with a soft and comfortable ride. Accordingly, ride cushioning system 50 disclosed herein provides a soft and comfortable ride for a great majority of operators regardless of the weight of such operators. However, the specific ride cushioning system disclosed herein is not part of this invention except to the extent that unit 2 includes a ride cushioning system that results in up and down pivotal motion of the platform during operation of unit 2 as indicated by the arrows C and D in FIG. 4.

The position of pad 28 as shown in FIG. 3 will remain substantially stationary while foot platform 16 is in motion up and down as illustrated by arrows C and D in FIG. 3. This is due to the fact that pivots 26, 43 and 45 are substantially aligned with one another along a common axis y as shown in FIG. 3 when foot platform 16 is in the substantially horizontal deployed position. Axis y angles upwardly and passes through a lower portion of pad 28. This alignment of pivots 26, 43 and 45 delivers nearly zero motion of pad 28 while foot platform 16 is in motion delivering suspension travel. In addition, the substantial alignment of pivots 26, 43 and 45 also delivers exceptionally high resistance to the forces applied to pad 28 by an operator leaning against pad 28 when foot platform 17 is substantially horizontal and pad 28 is inclined. The operator force from leaning against pad 28 will not cause foot platform 16 to substantially lift. This further enhances the comfort and operator stability provided by pad 28.

It is preferred that pad 28 be linked to foot platform 16 for pivotal motion relative to traction vehicle 6. Such linkage causes pad 28 to be deployed into the downwardly and rearwardly angle configuration as shown in FIGS. 2 and 3 simply by virtue of placing foot platform 16 into its substantially horizontal, deployed position thereof.

However, it is also contemplated that pad 28 could be pivoted between its downwardly and rearwardly inclined position as shown in FIGS. 2 and 3 and its inwardly folded position as shown in FIGS. 4 and 5 independently of foot platform 16. This would be done by the operator having to manually pull pad 28 out into the position of FIGS. 2 and 3 whenever the operator decides to deploy foot platform 16 into the deployed position of foot platform 16 shown in FIGS. 2 and 3, and for the operator to then manually push pad 28 back into the folded in position of FIGS. 4 and 5 before foot platform 16 is separately placed into the storage position shown thereof. While pad 28 in this independent configuration would not itself be automatically extended or deployed with foot platform 16 as foot platform 16 is deployed, pad 28 could still be disposed in the desired downwardly and rearwardly inclined position as shown in FIGS. 2 and 3 whenever foot platform 16 is in the stand on mode of operation. In the case of such an independently movable pad, a separate latch or lock (not shown) could be used to secure pad 28 in either of the two positions thereof.

Another feature of unit 2 of this invention, which can be optionally used if so desired, is a flexible guard or shield 60 that bridges the gap between the bottom end of pad 28 and foot platform 16. Flexible shield 60 has a top end 62 that is secured or clamped between pad 28 and second bracket 38. FIG. 3 shows top end 62 of shield 60 sandwiched between the back of second bracket 38 and the front of the bottom end of pad 28. Similarly, flexible shield 60 has a lower end 64 that is secured by screws or bolts 66 to an upwardly extending shoulder on platform frame 22. FIG. 2 illustrates the attachment of lower end 64 of flexible shield 60 to foot platform 16.

When foot platform 16 is in the substantially horizontal, deployed position thereof as shown in FIGS. 2 and 3, shield 60 extends or drapes down between pad 28 and foot platform 16 between the operator standing on foot platform 16 and the rear of vehicle frame 8. Shield 60 prevents the operator from contacting the hydraulic pumps and control systems on the rear of the traction vehicle 6, and specifically prevents accidental contact of traction vehicle 6 by the feet of the operator. Secondarily, shield 60 helps block heat, dust and debris arising from the operation of unit 2 from reaching or being thrown against the operator. These results are advantageous.

However, the flexible nature of shield 60 does not prevent foot platform 16 and pad 28 from being folded into the more compact storage positions thereof as shown in FIGS. 3 and 4. When foot platform 16 is folded up, thus causing pad 28 to pivot inwardly, flexible shield 60 simply gets folded up between pad 28 and foot platform 16. When foot platform 16 reaches its substantially vertical, storage position, flexible shield 60 is largely simply sandwiched between pad 28 and foot platform 16 which is not shown in FIGS. 4 and 5. Thus, flexible shield 60 does not obstruct or prevent the necessary movements of pad 28 and foot platform 16, but instead accommodates itself thereto. Shield 60 may be made of a flexible and bendable plastic material, but other flexible materials could also be used.

Various modifications of the disclosed embodiment of this invention will be apparent to those skilled in the art. Accordingly, the scope of this invention will be limited only by the appended claims.

We claim:

1. An outdoor power equipment unit, which comprises:
    (a) a self propelled traction vehicle;
    (b) an implement carried on the traction vehicle for performing a ground grooming or working operation;
    (c) a foot platform carried on a rear of the traction vehicle, wherein the foot platform is configured for supporting a standing operator in a stand on mode of operation of the traction vehicle; and
    (d) a pad carried on the rear of the traction vehicle in a first orientation having a downward and rearward angle of inclination relative to the traction vehicle to allow the standing operator's thighs to more comfortably engage the pad when the operator is standing atop the foot platform and is leaning or tilting forwardly, wherein the pad is movable on the traction vehicle into a second orientation that is substantially more vertical than that of the first orientation of the pad.

2. The outdoor power equipment unit of claim 1, wherein the pad is pivotal on the traction vehicle, wherein the pad in the second orientation thereof has been pivoted inwardly towards the rear of the traction vehicle to be relatively closely adjacent to the rear of the traction vehicle, and wherein the pad in the first orientation thereof has been pivoted rearwardly and outwardly away from the rear of the traction vehicle to be spaced away from the rear of the traction vehicle when disposed at the downward and rearward angle of inclination.

3. The outdoor power equipment unit of claim 2, wherein the foot platform is also pivotal on the traction vehicle to allow the foot platform to be swung upwardly relative to the traction vehicle from the orientation of the foot platform in the stand on mode of operation to permit the foot platform to be folded up against the rear of the traction vehicle, and wherein the pad in the second orientation thereof is sandwiched relatively closely between the rear of the traction vehicle and the folded up foot platform.

4. The outdoor power equipment unit of claim 3, wherein the foot platform and pad are pivotally interconnected to one another to cause the pad to move between the first and second orientation thereof as the foot platform is folded up.

5. An outdoor power equipment unit, which comprises:
    (a) a self propelled traction vehicle;
    (b) an implement carried on the traction vehicle for performing a ground grooming or working operation;
    (c) a foot platform carried on a rear of the traction vehicle, wherein the foot platform is pivotally mounted on the traction vehicle to permit the foot platform to be located in a substantially horizontal, deployed position for supporting a standing operator or to be pivoted upwardly relative to the traction vehicle from the deployed position to be placed into in a substantially vertical, storage position on the traction vehicle; and
    (d) a pad carried at a height on the rear of the traction vehicle to engage against the thighs of the standing operator when the foot platform is in the deployed position thereof and the operator is standing atop the foot platform, wherein the pad is movable on the traction vehicle with the pad having a first position that is pulled away from the rear of the traction vehicle when the foot platform is in the deployed position thereof and with the pad having a second position that is pushed inwardly closer to the rear of the traction vehicle when the foot platform is in the storage position thereof.

6. The outdoor power equipment unit of claim 5, wherein the pad when pulled away from the traction vehicle has a downward and rearward angle of inclination relative to the rear of the traction vehicle with an angled gap being present between the pad and the rear of the traction vehicle.

7. The outdoor power equipment unit of claim 6, wherein the pad when pushed inwardly towards the traction vehicle has a substantially more vertical orientation than when the pad is pulled away from the vehicle with the pad when pushed inwardly towards the traction vehicle lying substantially closely adjacent to the rear of the traction vehicle with the angled gap therebetween having been substantially narrowed.

8. The outdoor power equipment unit of claim 7, wherein the foot platform in the storage position thereof is disposed closely adjacent to and substantially nesting against the pad when the pad has been pushed inwardly towards the traction vehicle and the pad is in the substantially more vertical orientation thereof.

9. The outdoor power equipment unit of claim 5, wherein the pad and the foot platform have an interconnection to one another such that movement of the foot platform between the deployed and storage positions thereof causes the pad to automatically be moved from the first pulled away position thereof to the second pushed in position thereof.

10. The outdoor power equipment unit of claim 9, wherein the pad pivots on the traction vehicle to move between the first pulled away position thereof to the second pushed in position thereof, and wherein the interconnection comprises a connecting link that is pivotally connected at one end to the pad and at an opposite end to the foot platform.

11. The outdoor power equipment unit of claim 10, further including a ride cushioning system that permits pivotal movement of the foot platform relative to the traction vehicle during operation of the unit, and wherein the pivotal connections of the foot platform to the traction vehicle, of the connecting link to the foot platform, and of the connecting link to the pad are substantially aligned with one another along an axis that is configured relative to the pad to keep the pad substantially stationary relative to the traction vehicle during the pivotal up and down movements of the foot platform permitted by the ride cushioning system.

12. The outdoor power equipment unit of claim 5, wherein a vertical space is located between the pad and the foot platform when the foot platform is in the deployed position thereof and the pad is in the pulled away position thereof, and further including a shield extending between the pad and the foot platform when the foot platform is in the deployed position thereof and the pad is in the pulled away position thereof with the shield being located between the rear of the traction vehicle and the standing operator on the deployed foot platform such that the shield blocks the vertical space between the pad and the foot platform from the operator.

13. The outdoor power equipment unit of claim 12, wherein the shield is flexible and folds up between the pad and the foot platform when the foot platform is in the storage position thereof and the pad is in the pushed in position thereof.

14. The outdoor power equipment unit of claim 13, wherein the pad in the pushed position thereof, the folded up shield, and the foot platform in the storage position thereof are all substantially tightly nested against one another and against the rear of the traction vehicle.

15. The outdoor power equipment unit of claim 5, wherein the pad is a cushioned pad having an interior filling of a relatively soft and compressible material to allow the pad to compress under the weight of the operator's thighs to soften the engagement between the operator's thighs and the pad.

16. An outdoor power equipment unit, which comprises:
(a) a self propelled traction vehicle;
(b) an implement carried on the traction vehicle for performing a ground grooming or working operation;
(c) a pivotal foot platform for supporting a standing operator who operates the unit while standing atop the foot platform, wherein the foot platform can be pivoted upwardly from a substantially horizontal orientation into a substantially vertical, folded up orientation against the rear of the traction vehicle;
(d) a thigh pad that engages against the thighs of the operator and is pivotally linked to the foot platform to pivot on the traction vehicle with the pivotal motion of the foot platform, wherein the thigh pad is pivoted to be angled downwardly and rearwardly relative to the rear of the traction vehicle when the foot platform is in the substantially horizontal orientation, and wherein the thigh pad is pivoted inwardly relative to the rear of the traction vehicle to be sandwiched between the rear of the traction vehicle and the folded up foot platform when the foot platform is in the folded up orientation thereof.

* * * * *